United States Patent
Halligan

(10) Patent No.: US 10,440,022 B2
(45) Date of Patent: Oct. 8, 2019

(54) IDENTITY MANAGEMENT

(71) Applicant: Openwave Mobility Inc., Redwood City, CA (US)

(72) Inventor: Matt Halligan, Belfast (GB)

(73) Assignee: Openwave Mobility Inc., Redwood City, CA (US)

( * ) Notice: Subject to any disclaimer, the term of this patent is extended or adjusted under 35 U.S.C. 154(b) by 328 days.

(21) Appl. No.: 15/071,021

(22) Filed: Mar. 15, 2016

(65) Prior Publication Data

US 2016/0277406 A1    Sep. 22, 2016

(30) Foreign Application Priority Data

Mar. 17, 2015  (GB) .................................. 1504460.5

(51) Int. Cl.
*H04L 29/06* (2006.01)
*G06F 21/62* (2013.01)

(52) U.S. Cl.
CPC .......... *H04L 63/10* (2013.01); *G06F 21/6245* (2013.01); *H04L 63/0407* (2013.01); *H04L 63/0876* (2013.01); *H04L 63/0428* (2013.01); *H04L 63/08* (2013.01)

(58) Field of Classification Search
CPC ..... H04L 63/10; H04L 63/407; H04L 63/876; H04L 63/428; H04L 63/08; G06F 21/6245
See application file for complete search history.

(56) References Cited

U.S. PATENT DOCUMENTS

| | | | | |
|---|---|---|---|---|
| 6,047,327 A | * | 4/2000 | Tso | G06F 17/3087 |
| | | | | 707/E17.116 |
| 6,415,280 B1 | * | 7/2002 | Farber | G06F 17/30091 |
| | | | | 707/698 |
| 6,597,776 B1 | * | 7/2003 | Walker | G06Q 20/123 |
| | | | | 379/114.25 |
| 8,400,961 B1 | * | 3/2013 | Islam | H04W 8/24 |
| | | | | 370/328 |
| 9,769,108 B1 | * | 9/2017 | Bravmann | H04L 51/32 |
| 2003/0065562 A1 | | 4/2003 | Matsui et al. | |
| 2004/0088349 A1 | | 5/2004 | Beck et al. | |

(Continued)

FOREIGN PATENT DOCUMENTS

| | | |
|---|---|---|
| EP | 1668439 A1 | 6/2006 |
| EP | 2435979 A2 | 4/2012 |

(Continued)

*Primary Examiner* — Sarah Su
(74) *Attorney, Agent, or Firm* — EIP US LLP

(57) ABSTRACT

There are provided apparatuses and methods for providing user information stored at an access network to a content provider, the access network for providing a user device with access to the internet, the user information relating to a user of an application module stored on the user device, the user device for requesting and receiving content from a said content provider. A request for an identifier for the user device to use when requesting content from a content provider is received at an access network, which generates and transmits an identifier to the user device. A request from the content provider for user information is received at the access network, the request comprising the generated identifier. The access network obtains user information based on the identifier and transmits, to the content provider, the obtained user information.

20 Claims, 6 Drawing Sheets

(56) References Cited

U.S. PATENT DOCUMENTS

| | | | |
|---|---|---|---|
| 2007/0264987 A1 | 11/2007 | Gupta et al. | |
| 2008/0267117 A1* | 10/2008 | Stern | H04L 65/4084 370/329 |
| 2009/0094646 A1* | 4/2009 | Walter | H04N 7/17318 725/48 |
| 2009/0187575 A1* | 7/2009 | DaCosta | G06Q 30/06 |
| 2009/0234857 A1* | 9/2009 | Barault | G06F 21/10 |
| 2010/0192175 A1* | 7/2010 | Bachet | G06Q 10/0637 725/31 |
| 2010/0229241 A1 | 9/2010 | Liu et al. | |
| 2010/0263022 A1* | 10/2010 | Wynn | H04W 12/06 726/3 |
| 2010/0306048 A1 | 12/2010 | Corduneanu et al. | |
| 2011/0099252 A1* | 4/2011 | Jose | H04L 61/2015 709/220 |
| 2011/0231478 A1* | 9/2011 | Wheeler | G06F 17/30864 709/203 |
| 2012/0203865 A1 | 8/2012 | Graham, Jr. | |
| 2013/0074168 A1 | 3/2013 | Hao et al. | |
| 2013/0305272 A1 | 11/2013 | Fullet et al. | |
| 2014/0150123 A1* | 5/2014 | Alsina | G06F 21/10 726/33 |
| 2014/0220951 A1* | 8/2014 | Gumbrell | H04W 8/26 455/418 |
| 2014/0310779 A1* | 10/2014 | Lof | H04L 63/0421 726/4 |
| 2015/0113000 A1* | 4/2015 | Scheer | G06F 17/30064 707/746 |
| 2016/0066004 A1* | 3/2016 | Lieu | H04N 21/2541 725/29 |
| 2016/0150425 A1* | 5/2016 | Kuru | H04W 24/06 370/252 |
| 2017/0026949 A1* | 1/2017 | Ouyang | H04W 72/048 |

FOREIGN PATENT DOCUMENTS

| | | |
|---|---|---|
| GB | 2394385 A | 4/2004 |
| WO | 2005040999 A1 | 5/2005 |
| WO | 2010138891 A2 | 12/2010 |
| WO | 2015042310 A8 | 3/2015 |

* cited by examiner

IDENTITY MANAGEMENT

CROSS-REFERENCE TO RELATED APPLICATIONS

This application claims priority under 35 U.S.C. § 119(a) to UK Patent Application No. 1504460.5, filed on Mar. 17, 2015, the entire content of which is hereby incorporated by reference.

BACKGROUND OF THE INVENTION

Field of the Invention

The present invention relates to providing information stored at an access network to a content provider, and more specifically to providing user information relating to a user of a user device requesting content from the content provider.

Description of the Related Technology

Operators of access networks, for example mobile network operators, typically collect and store information relating to subscribers (referred to herein as users) of the mobile network. Such personal information may comprise, for example age, gender, preferences, and other personal information associated with that user, as well as location, browsing behaviors, network condition, and other contextual information associated with that user. For example, personal information may be collected upon registration of a user with the mobile network operator, or collected during use of the mobile operator network, and stored in a database within the mobile network operator's trusted network. As such, this information may therefore be proprietary to the mobile network operator.

Content providers, may typically use personal and/or contextual information associated with a user in order to personalize the content, and ultimately the experience, that is requested from and sent to a user device of the user. Such personalized content may, for example, include targeted advertising, specifically selected for a user based on, for example, the user's age, gender, and past browsing behavior. Such personal information may however be stored at, and proprietary to, a mobile network operator. Content providers are motivated therefore to obtain the personal information from the mobile network operator.

In some systems, a mobile network operator establishes trusted relationships with content providers. In this case, when a user requests content from one of these trusted content providers via the mobile network, the mobile network operator concatenates a user identifier to the request, which identifier the content provider can then use to lookup personal information associated with the user sending the request.

There are however, drawbacks to such systems, for example in relation to risks to data protection and security, and in establishing and maintaining trusted relationships with and between content providers.

It is an object of the present invention to mitigate at least some of the deficiencies of the prior art.

SUMMARY

In a first exemplary embodiment of the invention, there is a method for providing user information stored at an access network to a content provider, the access network being for providing a user device with access to the internet, the user information relating to a user of an application module stored on the user device, the user device for requesting and receiving content from a said content provider; the method comprising, at the access network: receiving, from the application module of the user device, a request for an identifier for the user device to use when requesting content from a said content provider, the received request comprising data identifying the content provider; generating, based on the received request, a said identifier; in response to the received request, transmitting, to the application module of the user device, the generated identifier; receiving, from the content provider, a request for user information, the request for user information comprising the generated identifier; obtaining, based on the generated identifier, user information; and transmitting, in response to the received request from the content provider, the obtained user information to the content provider.

In a second exemplary embodiment of the invention, there is a method for providing user information stored at an access network to a content provider, the access network being for providing a user device with access to the internet, the user information relating to a user of an application module stored on the user device, the user device for requesting and receiving content from a said content provider; the method comprising, at the user device: generating, at the application module, a request for an identifier for the user device to use when requesting content from a said content provider; transmitting, to the access network, the request for an identifier, the request for an identifier comprising data identifying the content provider; receiving, at the application module, from the access network, a said identifier generated by the access network; and causing a request for content to the content provider to comprise the received identifier.

In a third exemplary embodiment of the invention, there is a method for providing user information stored at an access network to a content provider, the access network being for providing a user device with access to the internet, the user information relating to a user of an application module stored on the user device, the user device for requesting and receiving content from a said content provider; the method comprising, at the content provider: receiving, from the user device, a request for content, the request for content comprising an identifier generated by the access network, the identifier being generated by the access network in response to a request, generated by the application module of the user device, to provide an identifier for the user device to use when requesting content from the content provider; transmitting, to the access network, a request for user information, the request comprising the identifier; receiving, from the access network, user information; and transmitting, to the user device, at least a portion of the requested content, at least a portion of the transmitted content being personalized using user information.

In a fourth exemplary embodiment of the invention, there is a computer readable medium with instructions stored thereon which when executed by a processing system cause the processing system to perform the method according to the first exemplary embodiment.

In a fifth exemplary embodiment of the invention, there is a computer readable medium with instructions stored thereon which when executed by a processing system cause the processing system to perform the method of according to the second exemplary embodiment.

In a sixth exemplary embodiment of the invention, there is a computer readable medium with instructions stored thereon which when executed by a processing system cause the processing system to perform the method according to the third exemplary embodiment.

In a seventh exemplary embodiment of the invention, there is an apparatus for use in providing user information stored at an access network to a content provider, the access network being for providing a user device with access to the internet, the user information relating to a user of an application module stored on the user device, the user device for requesting and receiving content from a said content provider; the apparatus being arranged to: receive, from the application module of the user device, a request for an identifier for the user device to use when requesting content from a said content provider, the received request comprising data identifying the content provider; generate, based on the received request, a said identifier; in response to the received request, transmit, to the application module of the user device, the generated identifier; receive, from the content provider, a request for user information, the request for user information comprising the generated identifier; obtain, based on the generated identifier, user information; and transmit, in response to the received request from the content provider, the obtained user information to the content provider.

In an eighth exemplary embodiment of the invention, there is an apparatus for use in providing user information stored at an access network to a content provider, the access network being for providing a user device with access to the internet, the user information relating to a user of an application module stored on the user device, the user device for requesting and receiving content from a said content provider; the apparatus being arranged to: generate, at the application module, a request for an identifier for the user device to use when requesting content from a said content provider; transmit, to the access network, the request for an identifier, the request for an identifier comprising data identifying the content provider; receive, at the application module, from the access network, a said identifier generated by the access network; and transmit, to the content provider, a request for content, the request for content comprising the received identifier.

In a ninth exemplary embodiment of the invention, there is an apparatus for use in providing user information stored at an access network to a content provider, the access network being for providing a user device with access to the internet, the user information relating to a user of an application module stored on the user device, the user device for requesting and receiving content from a said content provider; the apparatus being arranged to: receive, from the user device, a request for content, the request for content comprising an identifier generated by the access network, the identifier having been generated by the access network in response to a request, generated by the application module of the user device, to provide an identifier for the user device to use when requesting content from the content provider; transmit, to the access network, a request for user information, the request comprising the identifier; receive, from the access network, user information; and transmit, to the user device, at least a portion of the requested content, at least a portion of the transmitted content being personalized using user information.

Further features and advantages of the invention will become apparent from the following description of embodiments of the invention, given by way of example only, which is made with reference to the accompanying drawings.

DETAILED DESCRIPTION OF CERTAIN INVENTIVE EMBODIMENTS

Figure 1:
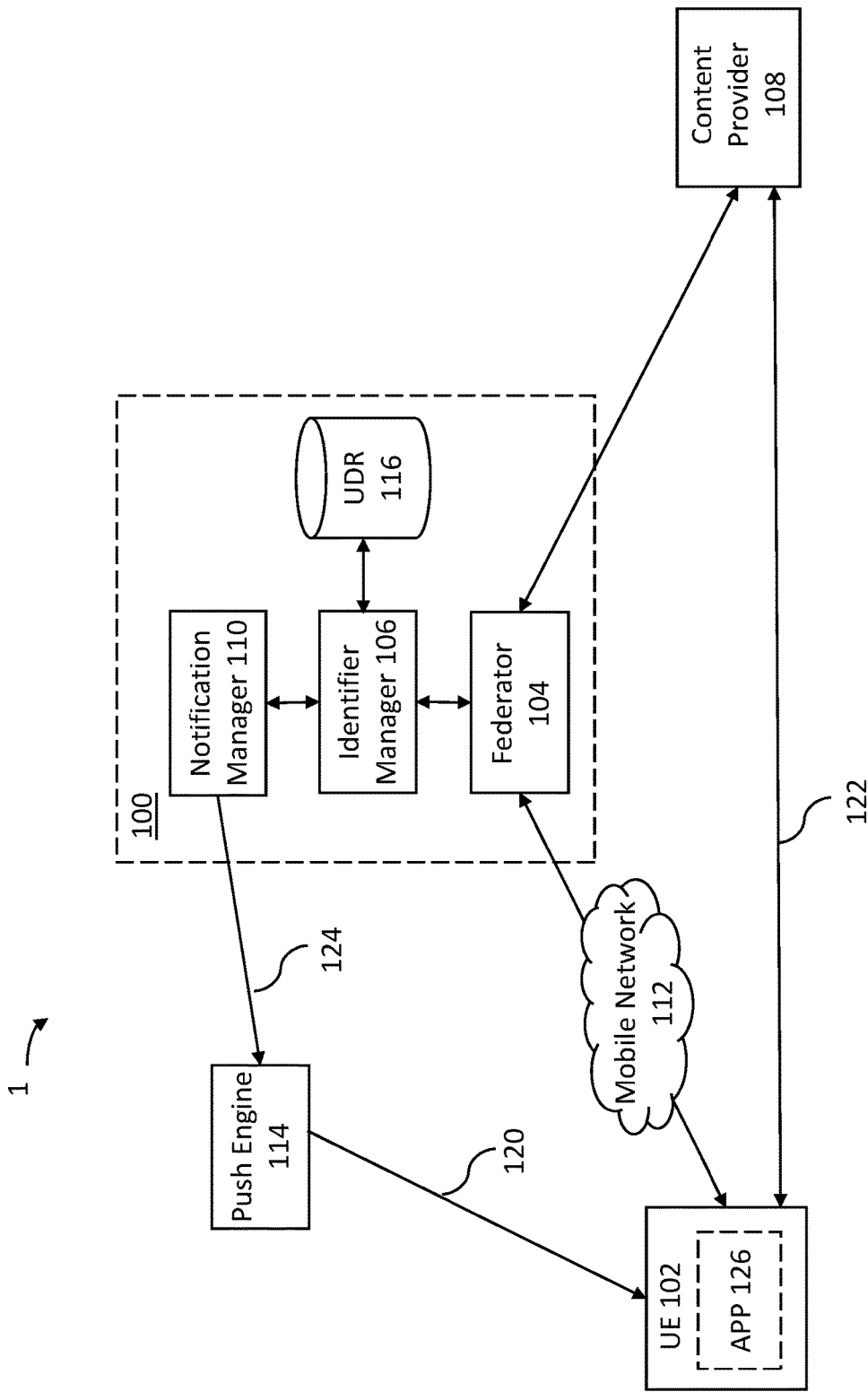
FIG. 1 is a schematic diagram of an exemplary network.

FIG. 1 is a schematic diagram of a communications network 1 in which embodiments of the present invention may be implemented according to an example.

Network 1 comprises User Equipment (UE) 102 in communication with Content provider 108 and federation system 100 located in a mobile network 112.

In essence UE 102, content provider 108 and federation system 100 communicate in order that content provider 108 may personalize content provided to UE 102 on the basis of user information held at the federation system 100. In essence, and as explained in more detail below, this is achieved by federation system 100 provisioning the UE 102 with an encrypted identifier for the UE 102 to include in requests to content provider 108. The content provider 108 may then use this encrypted identifier to request and receive personal information from the federation system 100 for use in personalizing content provided to the UE 102.

UE 102, also referred to herein as a user device, may be, for example, a mobile terminal, Personal Digital Assistant (PDA), or the like.

The UE 102 comprises an application module (APP) 126, for example running as software stored (e.g. installed or embedded) on the UE 102. APP 126 may be, for example, an app provided by the operator of mobile network 112. The APP 126 may be downloaded and stored onto UE 102, for example, from an app store or the like, which may be operated by a third party.

The UE 102 requests and receives content from a content provider 108 over communications channel 122.

Communications channel 122 comprises means for the UE 102 to access the content provider, for example, if the content provider is located on the internet, communication channel comprises an access point for UE 102 to access the internet, for example, via a Wi-Fi connection or the like. Although not shown in FIG. 1, communications channel may comprise mobile network 112, which may provide access to the internet for UE 102. The content provider 108 provides content requested by the UE 102 to the UE 102, for example, multimedia content such as pictures or video or the like.

The content provider 102 is arranged to perform personalization of content requested by, and sent to, the UE 102, on the basis of personal information relating to the user of the UE 102. Such personalization may comprise, for example, inserting targeted adverts, targeted on the basis of personal user information, into content sent to the user device. Such personal information may comprise, for example, age, gender, preferences, user browsing behaviors and other personal and/or contextual information associated with that user, as well as information associated with UE 102 such as location, network information and conditions, device type, billing information and other information associated with the UE 102. Such information may be, for example, static or dynamic, and may be constantly updated by the mobile network operator. The personal information may be used and/or stored according to validity conditions, for example, only context information associated with the last N transactions or last N days may be used and/or stored as personal information.

Federation system 100 comprises Federator 104, Identifier Manager 106, Notification manager 110, and User Data Repository (UDR) 116. In this example, the Federation system 100 is located within the trusted network of a mobile network operator (i.e. a cellular network operator).

UDR 116 stores personal information of users (subscribers) of the mobile network, which information may be proprietary to the mobile network operator.

The UE 102 communicates with the federation system 100 via mobile network 112.

The mobile network 112 may comprise a mobile operator gateway (not shown in FIG. 1), for example to provide proxy and firewall services for the mobile operator's trusted network.

Access to Federator 104 by UE 102 is restricted to only via the mobile network 112, for example by the Federator 104 only using a privately addressable IP within the mobile network that can only be resolved by a mobile network operator's Domain Name Server (DNS).

Some communication between UE 102 and Federator 104 is controlled by APP 126 stored on the UE 102.

The Federator 104 of the Federation system 100, as described in more detail below, receives a request from the UE 102 to provide the UE 102 with an identifier to use when requesting content from a given content provider 108. This identifier is then used by the content provider 108 in requesting personal information of the user from the federation system 100.

The Identifier Manager 106 manages identifiers for indicating an identity of a user of a given UE 102. These identifiers are those which the UE 102 is to use when requesting content from a given content provider 108. There may be multiple identifiers stored at the Identifier Manager 106 for a given user of a UE 102 or APP 126, for example, a different identifier associated with each different content provider 108 that the UE 102 may request content from. The identifier associated with each different content provider 108 for a given user of a UE 102 is unique amongst the identifiers for the given user.

The identifiers for a given user of a UE 102 are stored at the Identifier Manager 106 in association with a user identifier that identifies the user to the mobile network. The user identifier may be, for example, the user identifier assigned to the user of the UE 102 when he or she first registered with the mobile network operator, for example a unique customer reference number or the like, or a mobile phone number associated with the UE 102 of the user or the like.

The Identifier Manager 108 generates identifiers for the Federator 104 to provide to a UE 102 for including in requests for content from content providers 108, and for storing at the Identifier Manager 106. An identifier generated by the Identifier Manager 106 may be unique among all of the identifiers stored at the Identifier Manager 108. These generated identifiers are stored by the Identifier manager 106 in association with the user identifier identifying the user to the mobile network operator.

The Identifier Manager 106 is in communication with UDR 116, and retrieves, using a given user identifier, personal information relating to the user identified by the user identifier.

Before passing a generated identifier to the Federator 104 (which may communicate the identifier to outside of the mobile operator's trusted network) the Identifier Manager 106 encrypts the identifier, for example using an encryption key known only to the Identifier Manager 106.

The Federator 104 provides, as described in more detail below, a UE 102 with an identifier, for example over mobile network 112, and the UE may then include this identifier in requests for content from the content provider 108.

The identifier Manager 106 may decide from time to time to update a given identifier stored at the Identifier Manager 106. Updating an identifier may comprise, for example, generating a new identifier unique among the other identifiers, and then overwriting the identifier to be updated with the newly generated identifier. Alternatively, the Identifier Manager 106 may store the updated identifier in addition to the identifier to be replaced, along with an indication of which identifier is the most recently generated. The identifier Manager 106 may update an identifier periodically, for example, once a day, or, for example, as explained in more detail below, each time a given identifier is used in retrieving personal information of a user from the UDR 116 or otherwise.

The identifier manager 106 is in communication with notification manager 110. Upon updating an identifier, the identifier manager 106 notifies the notification manager 110 of the updated identifier, data identifying the content provider 108 with which the updated identifier is to be used, and data identifying the UE 102 which is to use the updated identifier.

The notification manager 110 is in communication, along communications path 124, with push engine 114 for providing a push notification service to the UE 102. The Notification manager 110 sends a request to the push engine 114 to send a push notification to UE 102 notifying the UE 102 of an updated identifier which it is to use for a given content provider 108. This notification occurs along communications path 120, and may happen asynchronously, for example whenever UE 102 is able to receive push notifications, for example when UE is next connected to a mobile data network, or to any suitable internet access point.

An exemplary implementation according to an embodiment of the invention will now be described with reference to the schematic signaling diagrams of FIGS. 2 to 4.

Figure 2:
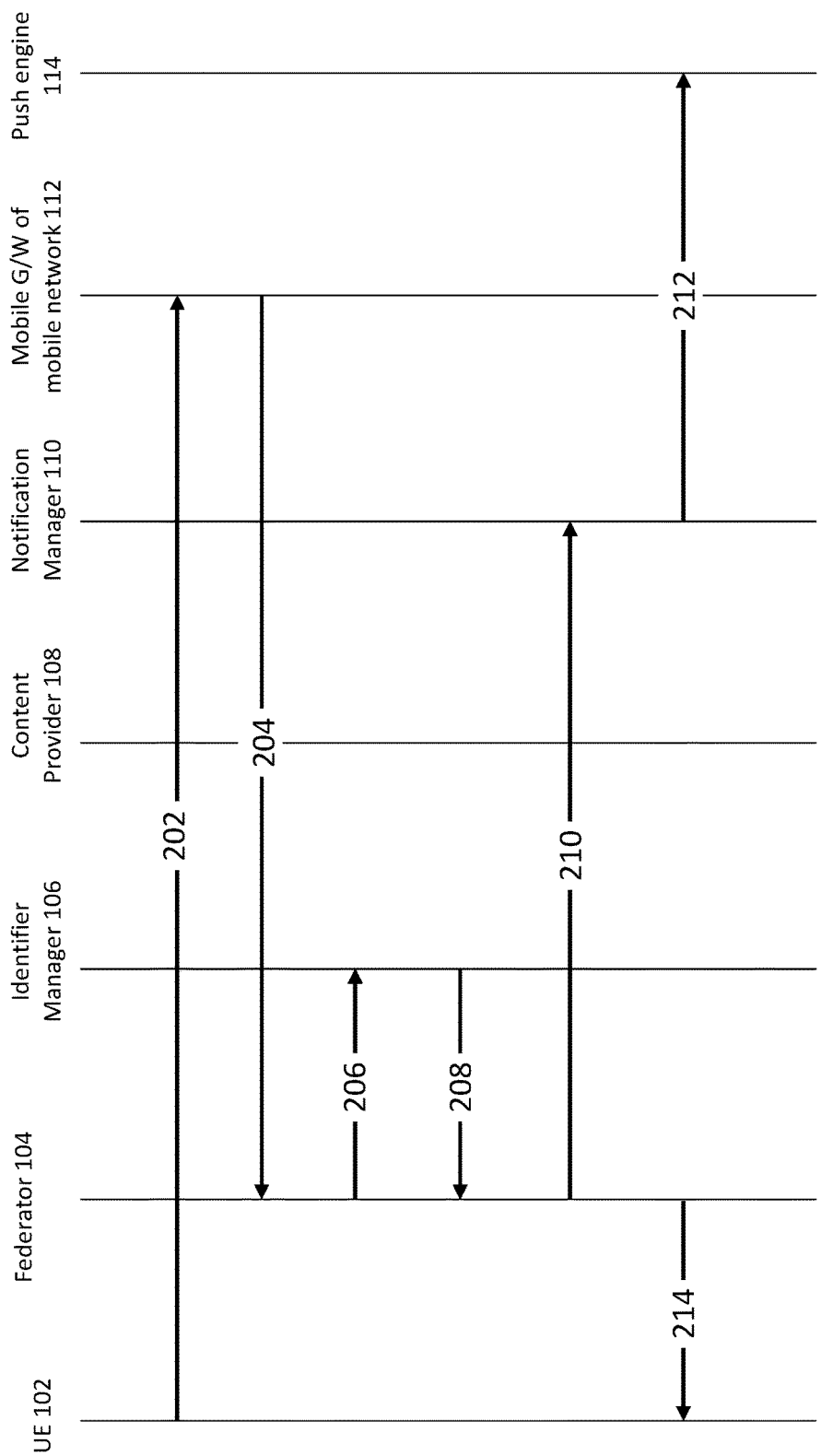
FIG. 2 is a schematic signaling diagram between components of an exemplary network.
Figure 3:
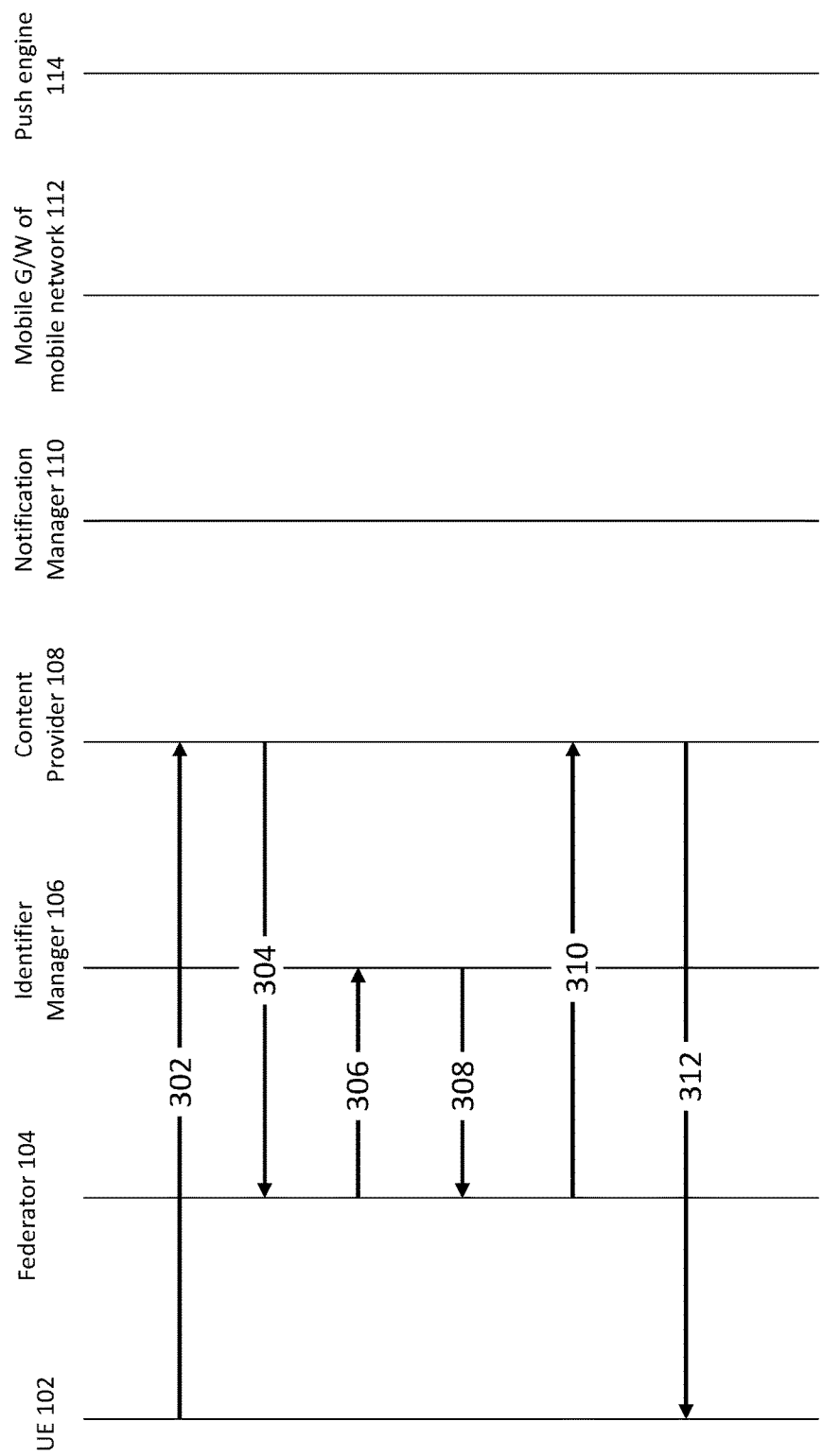
FIG. 3 is a schematic signaling diagram between components of an exemplary network.

FIG. 2 is a schematic signaling diagram of communications in system 1 in an exemplary registration process, i.e. when the application software APP 126 stored on UE 102 first determines that UE 102 is to obtain an encrypted identifier for use in requests to content provider 108. As described in more detail below, this determination may be made, for example, on the basis that the user of the UE 102 authorizes APP 126 to do so for a given content provider.

In response to a first determination that UE 102 is to use an identifier supplied by the federation system 100 for a certain content provider 108, the APP 126 causes the UE 102 to send request 202 to the mobile network 112, which is received, in this example, at mobile gate way of the mobile network 112.

Request 202 comprises a request for the UE 102 to be provisioned with an identifier for the UE 102 to use when requesting content from a given content provider 108. As such, request 202 also comprises information identifying the content provider 108 that the requested identifier is to be used with, for example a domain name of the content provider or the like.

Request 202 may also comprise information indicating that it is the first such request for a given UE 102 for a given content provider 108. Request 202 may comprise a request for the UE 102 to be registered for receiving push notifications from push engine 102 by which, as described in more detail below, the UE 102 may receive updated identifiers.

Request 202 is received at a gateway of the mobile network 112, and the mobile gateway determines whether or not the content provider 108 specified in request 202 is a registered content provider 108, i.e. a content provider 108 that is registered to use the identifier service offered by federation system 100. On determination that request 202 is associated with a registered content provider 108, the mobile gateway of mobile network 112 sends request 204 to federator 104. Request 204 contains substantially the same information as request 202, and may also include information identifying the user and/or the UE 102 from which the request 202 originated.

Request 204 is received at federator 104. Federator 104 may then authenticate the user identified in request 204, and determine upon successful authentication to issue the UE 102 with an identifier. Authentication may be achieved, for example, using known authentication elements and/or protocols of a mobile network, such as a Policy and Charging Rules Function (PCRF) (not shown) or an Authentication, Authorization, and Accounting (AAA) server (not shown) accessed for example via a Remote Authentication Dial-in User Service (RADIUS) (not shown). Additionally, the federator 104 may determine whether the identified user is currently permitted to be provisioned with an identifier for one or more content providers 108. If the authentication is not successful and/or it is determined that the identified user of UE 102 is not permitted to be provisioned with an identifier, the federator 104 may refuse the request to provision the UE 102 with an identifier.

Upon successful authentication and a successful determination that the UE 108 is to be provisioned with an identifier, the federator 104 then sends request 206 to identifier manager 106 for identifier manager 106 to generate an identifier for the UE 102 to use when requesting content from the content provider 108. The identifier manager 106 then generates an identifier, and stores it in association with a user identifier identifying the user to the mobile network operator. The user identifier is a user identifier which may be used in queries to UDR 116 in order to retrieve user personal information. The generated identifier may be generated to be unique among all other identifiers stored at the identifier manager 106. Alternatively, the identifier manager 106 may only store a generated identifier if it is determined to be unique among all other identifiers stored at the identifier manager 106. The identifier manager 106 stores the generated identifier in association with information identifying the content provider 108 that the generated identifier is to be used with, for example the information identifying the content provider 108 in the request 202. The information identifying the content provider 108 that the generated identifier is to be used with may take the form, for example, of a 64 bit integer or 128 bit integer or the like.

The identifier manager 106 encrypts the generated identifier using an encryption key stored at the identifier manager 106, and passes the encrypted identifier to federator 104 in response 208. The encryption is performed using an encryption key known only to, and stored securely within, the identifier manager 106. Response 208 may be in response to request 206 sent by federator 104, and so federator 104 may therefore associate the encrypted identifier in response 208 with the UE 102 and content provider 108 identified in request 206. Alternatively, response 208 may include data identifying UE 102 and content provider 206 with which the encrypted identifier is associated.

Federator 104, after a determination that request 202 represented the first such request from a given UE 102 for a given content provider 108, and/or after authenticating the user, and/or after a determination that request 202 comprises a request to register the UE 102 to receive push notifications of updated identifiers, transmits request 210 to notification manager 110 for the notification manager 110 to register UE 102 for receiving push notifications. As described in more detail below, such push notifications comprise updated identifiers generated by the identifier manager 106 to be sent to the UE 108.

Notification manager 110 then sends request 212 to push engine 114 to register UE 102 for receiving push notifications from push engine 114. Request 212 includes information identifying the UE 102 that push engine 114 is to register. The push engine 114 may be operated by the mobile network operator.

Push engine 114 then registers UE 102 for receiving push notifications from push engine 114 (not shown in FIG. 2).

As an alternative to the registration for push notifications via notification manager 110 described above, the UE 102 may request to be registered with push engine 114 directly. In this case, push engine 114 may represent, for example, a third party push notification service, for example Apple® Push notification service or Google™ Notification Service (not shown in FIG. 2). In this alternative example, UE 102 sends a request, generated by APP 126, directly to push engine 114 to be registered to receive push notifications. The push engine 114 then registers UE 102 for receiving push notifications, generates a token identifying the UE 102 to the push engine 114, and transmits this token to the UE 102. The UE 102 then communicates this token and details of the registration to the federator 104, and this information is stored within the federation system 100, for example, at notification manager 110. If federation system 100 determines to cause a push notification to be sent to the UE 102 (for example to communicate an updated identifier to UE 102 as described in more detail below), the notification manager 110 sends a request to the push engine 114 that includes this token, and details of the information the push notification is to contain. The push engine 114 can then use the token to identify the UE 102 and send a push notification to UE 102 accordingly.

Returning to the example of FIG. 2, Federator 104 sends, after receiving response 208 from the identifier manager 106 containing the generated encrypted identifier, response 214 to UE 102 to inform UE 102 of the encrypted identifier that UE 102 is to use when requesting content from content provider 108. Response 214 may be in response to request 202, and therefore UE 102 may infer the content provider 108 with which the received encrypted identifier is to be used from the information identifying the content provider 108 in the request 202. Alternatively, response 214 may comprise information identifying the content provider 108 with which the encrypted identifier is to be used.

After receiving response 214, APP 126 causes to be stored at the UE 102 the received encrypted identifier in association with information identifying the content provider with which the identifier is to be used. FIG. 3 is a schematic signaling diagram illustrating exemplary communications in communication network 1 when a UE 102 requests content from a content provider 108 using an encrypted identifier.

In this example, the user of UE 102 controls UE 102 such that UE 102 generates a request for content 302 for sending to content provider 108. For example, the user may control a browser of the UE 102 to navigate to a website, say, Abc.com, and request content from that website. UE 102 queries a memory of the UE (not shown in FIG. 3) to determine whether there is an encrypted identifier stored for use in requests for content from Abc.com (i.e. content provider 108). The query may originate from APP 126. On a determination that there is an encrypted identifier stored at the UE 108 which the UE 102 is to include in requests to Abc.com (i.e. content provider 108) the APP 126 of the UE 102 causes the encrypted identifier to be included into the generated request for content 302. For example, the request 302 may be a HTTP request, and the encrypted identifier may be included in a header of the HTTP request 302. In this example, the APP 126 may cause the encrypted identifier to be inserted into the header of the request 302. In another example, the encrypted identifier may be included as a query parameter or as POST data in a modified URL of the content provider 108 of the request 302 sent by the UE 102. In this example, the APP 126 may cause the URL of the request 302 to be modified to include the encrypted identifier. In another example, the encrypted identifier may be included in a cookie associated with the content provider 108 from which content is being requested. In this example, APP 126 may cause the encrypted identifier to be inserted into an appropriate cookie stored at UE 102.

In any case, UE 102 then sends request 302 including the encrypted identifier to content provider 108. The request 302 comprises data identifying the content which the UE 102 requests.

On receiving request 302, content provider 108 determines that the request includes an encrypted identifier, and so determines that content provided in response to this request is to be personalized based on personal information obtained using the encrypted identifier. The content provider 108 may determine that a specific request 302 is such a request by, for example, looking for an encrypted identifier in a specific location in the HTTP request, for example in a header field used for denoting such an identifier. The encrypted identifier may alternatively be suitably identified in the request 302, for example by being preceded by an identifier identifying it as an encrypted identifier to be used with federation system 100. For example, in the example request "https://contentprovider108.co.uk/news?MyIdentifier=12334768" the string "?MyIdentifier=" may identify to the content provider with domain name "contentprovider108.co.uk" that the requested content (i.e. "/news") is to be personalized by retrieving data from federator system 100 using encrypted identifier "12345678". The encrypted identifier may alternatively be suitably identifiable to the content provider 108 by being located at a predefined location within a cookie associated with content provider 108, or by being suitably identified within the cookie, for example by being preceded by the string "MyIdentifier=".

In any case, from an analysis of the content requested in request 302, the content provider 108 then determines which personal information it is to request from federator system 100 in order to personalize the content (or at least a portion of the content) it is to provide to UE 102. For example, the content provider 108 may determine that for the content requested, the content may only be personalized, or be most effectively personalized, on the basis of the age of the user, and so the content provider may determine only to request the age of the user associated with received request 302 from the federation system 100. In another example, the content provider 108 may determine that age and browsing history are to be requested.

The content provider 108 generates request 304, which may comprise the encrypted identifier and information identifying the personal information requested to be provided to the content provider 108. The information identifying the personal information requested may be communicated to the federation system 100, for example, using known means such as via a Representational State Transfer (REST) Application Programming Interface (API), or using Simple Object Access Protocol (SOAP).

In one example, the request 304 may not include information identifying personal information requested, and the mere presence of an encrypted identifier in request 304 may be sufficient to communicate to the federator system 100 that user information is being requested by content provider 108.

Alternatively, the information requested may be identified merely by the combination of the encrypted identifier and the identity of the content provider 108 making the request. For example, a content provider may prearrange with the federator system 100 which user information is to be provided on request. Alternatively, the information requested may be identified according to one or more predetermined methods that may be indexed according to a method identifier included in the request 304. For example, a method identifier of "1" included in request 304 may communicate to the federator system 100 that, say, 10 attributes are being requested, or that 10 attributes including at least "age" and "browsing history" are being requested etc. according to the predetermined meaning of that method identifier.

Alternatively, the request 304 may have a predetermined structure, for example a number of fields each indicating a particular facet of personal information, and within each field, an indication of whether the facet of personal information associated with the field is requested. The predetermined structure of the request may be predetermined between the content provider 108 and the federation system 100 on registration of the content provider with the federation system.

In any case, the request 304 comprises data identifying the content provider from which the request originates.

Content provider 108 sends request 304 to federator 104. Upon receipt of request 304, federator 104 may authenticate content provider 108 identified in the request, and determines whether or not content provider 108 is registered with the federation system 100. Authentication of the content provider 108 may occur by referring to UDR 116, which may store a list of authorized content providers in association with their access privileges. This content provider list may be stored under a separate tree to the user information in the UDR 116, for example so as to keep access to the content provider list separate from access to the user information.

If the federator 104 fails to authenticate the content provider 108, or determines that the content provider 108 is requesting information outside of its associated privileges, the federator 104 may refuse the request 304.

Upon successful authentication, authorization, and/or registration checks, the federator 104 sends request 306 to identifier manager 106 to retrieve the personal information requested in message 304 for the encrypted identifier included in the message 304. As such, the request 306 comprises the encrypted identifier and the personal information to be retrieved for that identifier.

The identifier manager 106 upon receiving request 306 decrypts the encrypted identifier included therein. The identifier manager 106 decrypts the encrypted identifier using the encryption key with which the identifier was originally encrypted.

The identifier manager 106 then looks up the identifier of the content provider 108 stored in association with the identifier by the identifier manager 106 (for example stored as described above with reference to FIG. 2).

The identifier manager 106 compares the identifier of the associated content provider 108 with the identifier of the content provider indicated in the request 306. If the content provider identifiers are determined to indicate the same content provider 108, then the identifier manager 108 proceeds with processing the request for personal information. If the compared identifiers are determined to indicate different content providers, then there is a chance that the received request for personal information is not an authorized request, e.g. a spoof request from a third party, and the identifier manager 108 may not proceed to retrieve the requested personal information, and may for example send an error message to content provider 108 in response to request 304.

The identifier manager 106 looks up the user identifier identifying the user to the mobile network operator, stored in association with the decrypted identifier. The identifier manager 108 then uses the user identifier to query the UDR 116 (not shown in FIG. 3) for the personal information requested by the content provider 108. Having obtained at least some of the requested personal information from the UDR 116, the identifier manager provides the retrieved personal information to federator 104 in response 308. Response 308 may be in response to request 306, and so the encrypted identifier with which the personal information provided in response 308 is associated may be inferred by federator 104. The response 308 may alternatively comprise the encrypted identifier with which it is associated. Response 308 may not, however, comprise the decrypted identifier, or the user identifier, both of which are kept from the content provider 108.

Federator then sends response 310 to content provider 108, response 310 comprising at least some of the personal information requested in request 304.

Response 310 may be sent in response to request 304, and so the encrypted identifier with which the personal information is associated may be inferred by content provider 108. Alternatively, response 310 may comprise the encrypted identifier to which the personal information corresponds. Response 310 may, for example, include the personal information in the payload of the response, for example in a mark-up form, for example using Extensible Markup Language (XML).

Content provider 108 uses the personal (i.e. user) information received in response 310 to personalize content requested by the UE 102 in request 302.

Content provider 108 then sends response 312 comprising at least a portion of the content requested by the UE 102 in request 302, at least a portion of the content being personalized using the personal information received by the content provider in response 310.

In such a way as described above, the content provider 108 may personalize content requested by a UE 108 according to personal information stored at a mobile network operator, without ever knowing the identity of the user, or an association between the user and the personal information. The user information remains securely stored at, and proprietary to, the mobile operator network.

Further, since for a given UE 102, each individual content provider is associated with a unique identifier, content providers are restricted from spoofing requests for personal information between each other, and are restricted from pooling retrieved personal information for a given identifier. Further, in such a way as described above, the request 302 may be sent over a communications channel (e.g. communications channel 122 in FIG. 1) that comprises mobile network 112, or equally it may be sent over a communication channel that does not comprise mobile network 112 (i.e. wherein access to the internet is provided to the UE 102 by some other means, for example via Wi-Fi). As a result, content providers may personalize content sent to a UE 102, based on personal information held at a mobile network operator, regardless of whether or not the UE 102 is connected to the mobile network 112 (i.e. whether the UE 102 gains access to the internet via mobile network 112 or via some other means, e.g. via Wi-Fi).

Figure 4:
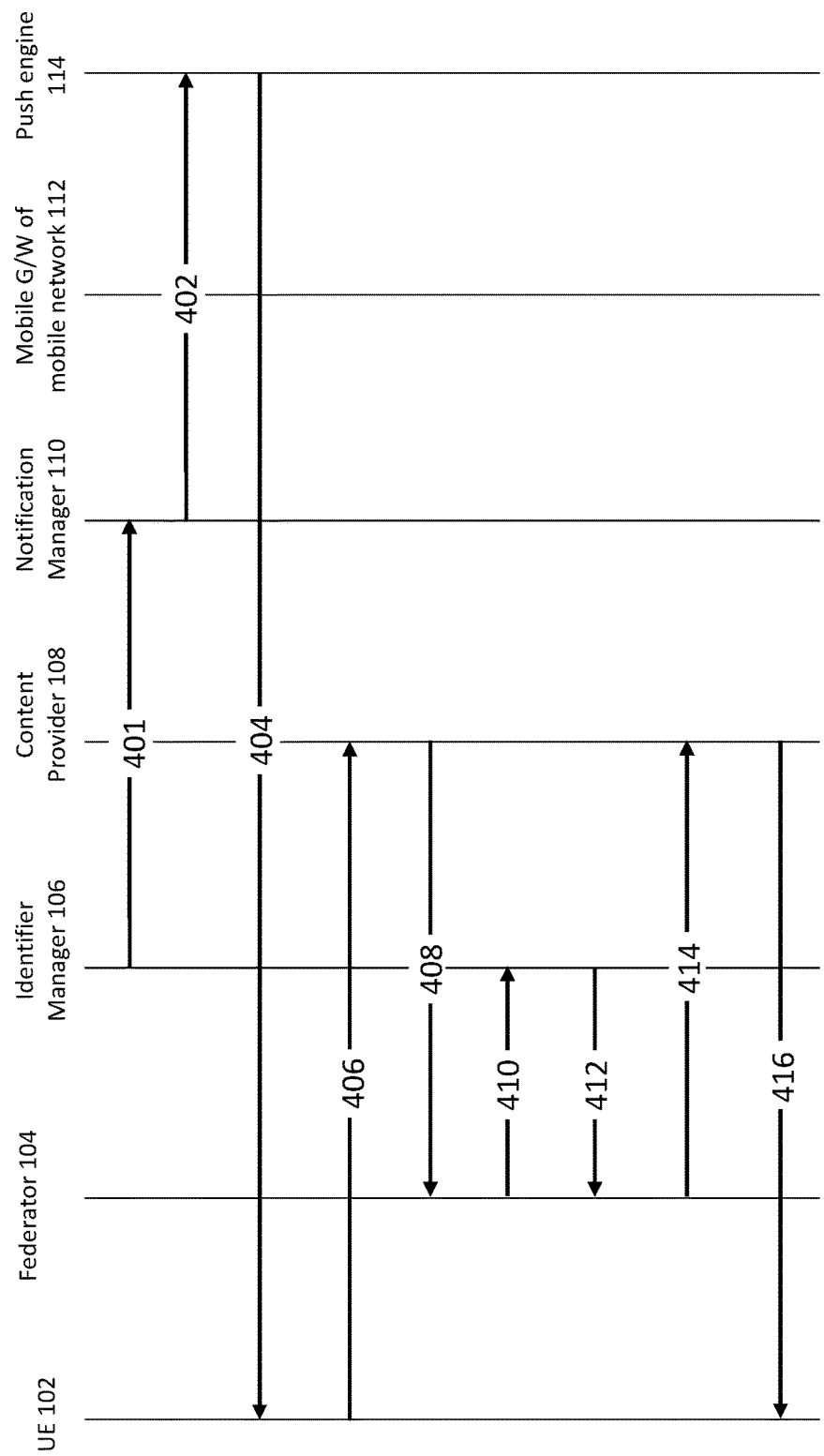
FIG. 4 is a schematic signaling diagram between components of an exemplary network.

FIG. 4 is a schematic signaling diagram illustrating communications in communications network 1 according to an exemplary embodiment when an encrypted identifier is to be updated.

Identifier manager 106 determines that an identifier stored therein is to be updated. This determination may occur periodically, for example once a day. This determination may also be made, for example, on determination that a content provider 108 has made a request to federation system 100 for personal information (e.g. request 304 of FIG. 3) using that identifier. Upon such a determination that an identifier is to be updated, identifier manager 106 generates an updated identifier, which updated identifier may unique among all other identifiers stored at the identifier manager 106. The identifier manager may overwrite the identifier to be updated with the generated updated identifier, or may store it in addition to the identifier to be updated.

Once the identifier manager 106 has stored the updated identifier, the identifier manager encrypts the updated identifier and sends it in request 401 to notification manager 110. Request 401 comprises information identifying the UE 102 and the content provider with which the updated identifier is associated.

The notification manager 402 then sends request 402 to push engine 114 for the push engine to send a push notification to UE 102 informing it of the updated identifier and the content provider with which it is to be used. In embodiments where UE 102 registers directly with the push engine 114 for receiving push notifications (as described above), request 402 includes the token generated by push engine 114 identifying the UE 102 to push engine 114.

The push engine 114 then sends asynchronously push notification 404 to UE 102 notifying UE 102 of the updated identifier and the content provider 108 with which it is to be used. The UE 102 may then overwrite the identifier it currently has stored for use with that content provider 108 with the updated identifier received in push notification 404. Alternatively, the UE 102 may store the updated identifier with an indication that the updated identifier is the identifier to include in requests to the content provider 108 from the time at which the push notification 404 was received, or alternatively some specified time in the future. This may prevent UE 102 sending a request to a content provider 106 with an identifier that is out of date with respect to the identifier held at the identifier manager 106.

The UE 102 having updated the identifier according to push notification 404, sends a request 406 for content to content provider 108 including the encrypted updated identifier.

The content provider 108 does not recognize the encrypted updated identifier, and so in order to personalize the content of the response, it must again request personal information from federation system 100.

Similarly to as described above with reference to FIG. 3, content provider requests personal information with which to personalize the requested content with request 408 to federator 104. The federator 104 requests the identifier manager to provide the requested personal information with request 410. The identifier manager 106 decrypts the updated identifier, use it to look up the user identifier, and uses the user identifier to retrieve at least a portion of the requested personal information from UDR 116 (not shown in FIG. 4). The identifier manager 106 then passes the retrieved personal information to federator 104 with response 412, and the federator in turn passes the retrieved personal information on to content provider 108 with response 414. The content provider 108 may now personalize at least a portion of the content using the received personal information, and provide the requested content to the UE 108 with response message 416.

By updating the identifiers as described above, the content provider is restricted from using an encrypted identifier as a pseudo identifier in order to build up its own database of associations between an encrypted identifier and personal information. In such a way, a content provider is restricted from bypassing the federation system 100 in providing content personalized with information held at the federation system, and as such the personal information remains proprietary to the mobile network operator. In such a way the security of the personal information can be enhanced and ensured by the mobile network operator.

Further, in such a way as described above, the identifiers may be updated at the UE 102 without the UE 102 needing to be connected to the mobile network 112.

Figure 5B:
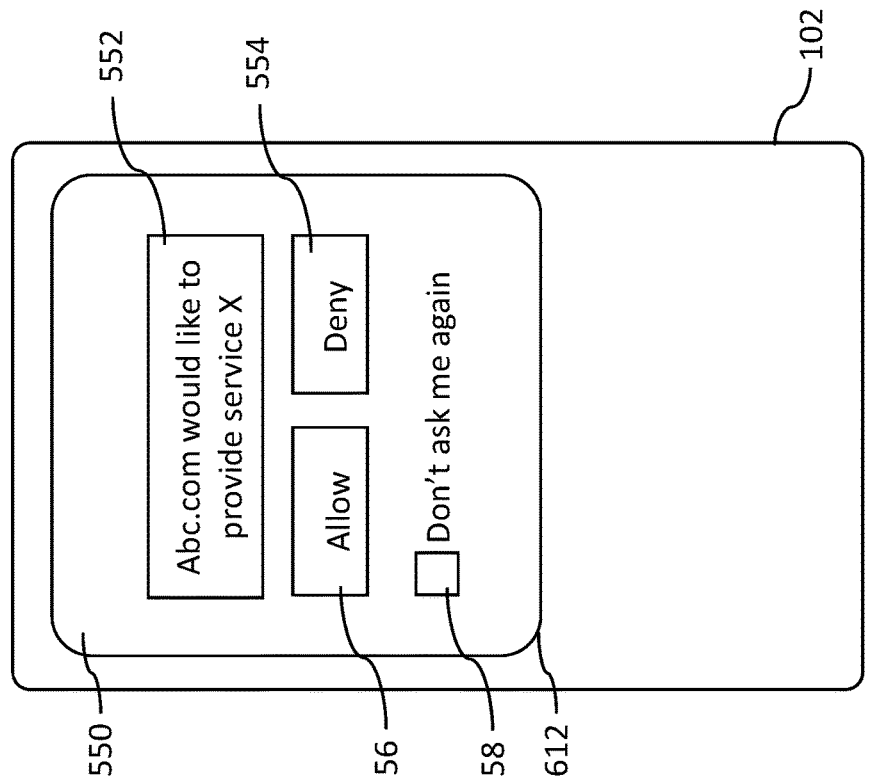
FIG. 5b is a schematic illustration of a display of a user device according to an example.
Figure 5A:
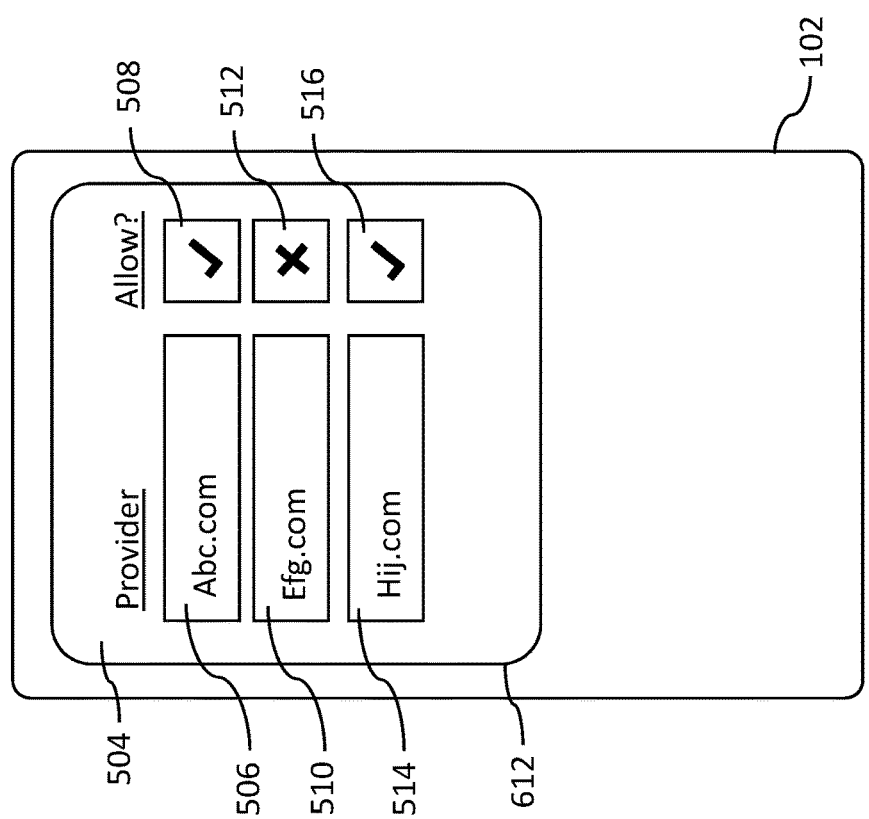
FIG. 5a is a schematic illustration of a display of a user device according to an example.

FIGS. 5a and 5b are schematic diagrams of exemplary GUIs of APP 126 displayed on UE 102 according to some exemplary embodiments.

FIG. 5a shows a GUI 504 displayed on display screen 612 of UE 102. GUI 504 may be controlled to be displayed by APP 126 when a user interrogates APP 126 to show for which content providers 108 the UE 102 is currently configured to include (or not include) an encrypted identifier in requests for content. In the example of FIG. 5a, the GUI 504 displays provider "Abc.com" in box 506, "Efg.com" in box 510, and "Hij.com" in box 514. Each content provider 108 may be displayed on GUI 504 in view of, for example, the UE 102 having previously sent a request for content from each content provider 108. In other embodiments, the content providers 108 displayed may be those for which an identifier has been generated at the federation system 100 and, for example, an encrypted identifier for that content provider 108 is stored on the UE 102. Associated with each content provider 506, 510, and 514, there is a box (508, 512, and 516 respectively) indicating whether the APP 126, and hence the UE 102, has authorization from the user of the UE 102 to include an encrypted identifier in requests to the associated content provider (i.e. whether the user subscribes to the personalization service offered by the associated content provider, i.e. whether the user authorizes the associated content provider to request and receive the user's personal information held at the mobile network operator using federator 100 in the manner as described above).

In other embodiments, the content providers 108 displayed may be content providers that are registered with the federation system 100 to use the user information service provided by federation system 100. In this example therefore, the displayed content providers need not be content providers from which the UE 102 has previously requested content. In this example, each content provider box (e.g. 508, 512, 516) also represents whether the user authorizes APP 126 to request from federation system 100 an identifier to include in future requests for content from the associated content provider.

In the example of FIG. 5a, box 508 contains a "tick" symbol, box 512 contains a "cross" symbol and box 516 contains a "tick" symbol, representing in this example that the UE 102 is to include the appropriate encrypted identifier in requests for content from "Abc.com" and "Hij.com", but not from "Efg.com".

In the case where content has not previously been requested from a displayed content provider 108 by the UE 102, the user indicating a "tick" in the associated box may cause APP 126 to transmit a request (for example request 202 of FIG. 2) to federation system 100 for an encrypted identifier which UE 102 is to include in future requests for content from that content provider.

The preferences indicated by boxes 508, 512, and 516 may be changed at any time by a user, for example by toggling a "tick" into a "cross" and thereby controlling the APP 126, and hence the UE 102, to no longer to include an encrypted identifier in requests to the associated content provider 108 or vice versa.

In some exemplary embodiments, in order to obtain and manage user authorization for different content providers 108, the APP 112 may cause a browser (not shown) of the UE 102 to be redirected to a portal (not shown). This portal may, for example, be hosted by the operator of mobile network with which federation system 100 is associated. This portal may require a user to provide log in details, for example to authenticate the user to the mobile network operator and/or federation system 100. The user may then be presented with a GUI rendered by the browser (not shown), for example a GUI similar to that shown in FIG. 5a. The user may then manage his or her authorizations via the portal. The APP 112 may then obtain updates of changes to authentication that have occurred on the portal, for example via push notifications from the host of the portal.

FIG. 5b shows an exemplary GUI 550 of APP 122 that may be displayed on display screen 612 of UE 102, for example when the APP 112 detects that the UE 102 is accessing, or sending a request for content to, a content provider 108 registered with federation system 100 for the first time. Here "first time" may include the first time since the APP 112 has been active on the UE 102, or the first time since the APP 112 has been reset, or the first time that such a request has been detected since the associated content provider 108 has been registered with federation system 100.

In the example of FIG. 5b, there is displayed box 552, which indicates to the user the identity of the content provider 108, and the service which content provider would like to offer. For example, box 552 in FIG. 5b may read "Abc.com would like to provide service X". Service "X" may be any service which may utilize the personal information held at mobile network operator 112, for example to personalize the content provided to UE 102.

The GUI 550 also displays interactive boxes 556 and 554 for allowing the user to indicate his or her authorization of the proposal displayed in box 552. For example, box 556 may display "Allow" and if pressed may provide authorization to the APP 126, and hence the UE 102, to request an encrypted identifier to use with the associated content provider (e.g. as described with reference to FIG. 3). Box 554 may, however, read "Deny", and if pressed may deny authorization to the APP 112, and hence the UE 102, to request an encrypted user identifier at this time.

In some embodiments, on GUI 550 there may also be displayed "tick box" 558, which may be toggled to indicate (or not) that the decision indicated by a press of box 556 ("Allow") or 554 ("Deny") is final, and that the GUI 550 should not be displayed again for that given content provider 108. For example, text next to tick box 558 may read "Don't ask me again". For example, if tick box 558 is ticked when the user presses box 554 ("Deny"), then the APP 112 will not display GUI 550 when the APP 112 detects further requests for content from the associated content provider 108. However, if tick box 558 is not ticked when box 554 ("Deny") is pressed, then the APP 112 will display GUI 550, and hence seek the user's authorization to request an encrypted identifier, the next time that APP 112 detects that the UE 102 is accessing, or requesting content from, the associated content provider 108.

In some exemplary embodiments, the user may indicate whether or not he or she authorizes his or her personal information to be provided to a given content provider 108 by communicating with the federation system 100.

In an example, when the federation system 100 receives a UE 102 request for an encrypted identifier for a given content provider 108 for the first time, the federation system 100 may communicate (not shown) with the UE 102. This communication may, for example, be out-of-band, for example via a Short Message Service (SMS) message (not shown). This SMS may include text asking the user of the UE 102 whether or not he or she authorizes his or her personal information to be provided to content provider 108. The user may send an SMS message (not shown) in reply indicating that authorization is given. This reply message may also represent a generic authorization for the user's personal information to be provided to any participant content provider 108 to which a request is sent from UE 102 for an encrypted identifier. This SMS message may also be used to formally authenticate to federation system 100 a given requesting UE 102 as being associated with a given mobile phone number (and hence user). The result of the authorization may be provided to the APP 112, for example so that it can store the authorizations locally.

In another example, the communication between the user and the federation system 100 may be via a pop-up window (not shown) hosted by the federation system 100. When the federation system 100 receives a request from UE 102 for an encrypted identifier for a given content provider 108, the federation system 100 (or mobile network operator associated therewith) may cause a pop-up window to be displayed on a browser (not shown) of the UE 102. The text of the pop-up window may ask the user to authorize the use of the service requested by UE 102, or a general authorization, as required (e.g. similarly to that described above with reference to FIG. 5b). The pop-up window may include buttons to allow the user to indicate his or her authorization, which may then be communicated to the federation system 100. The result of the authorization may be provided to the APP 112, for example so that it can store the authorizations locally.

Authorization via communication with the federation system 100 may be in addition to or a replacement of the authorization request presented by APP 112 as described above with reference to FIG. 5b. If it is a replacement authorization, it will be appreciated that the APP 112 need not ask for the user's authorization before sending a first request for an encrypted identifier for a given content provider 108 to the federation system 100 as described above with reference to FIG. 5b, as this can be done instead via communication with the federation system 100.

In any such way, embodiments of the present invention allow a user to control the content providers 108 that have access to their personal information stored at federation system 100. In such a way, the way in which a user's personal information is provided, and to which content providers it is provided, is made clearly visible to and controllable by the user, and so the security of the personal information, for example against third parties untrusted by the user, may be enhanced.

Figure 6B:
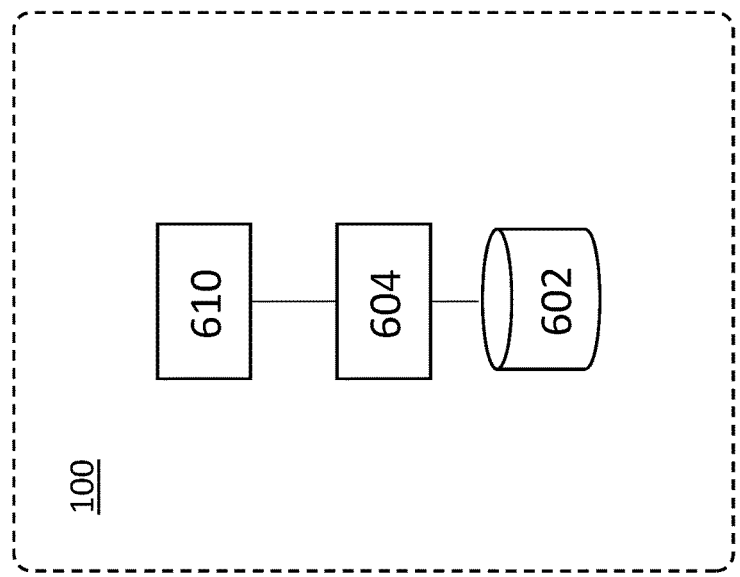
FIG. 6b is a schematic diagram of an exemplary network element.
Figure 6A:
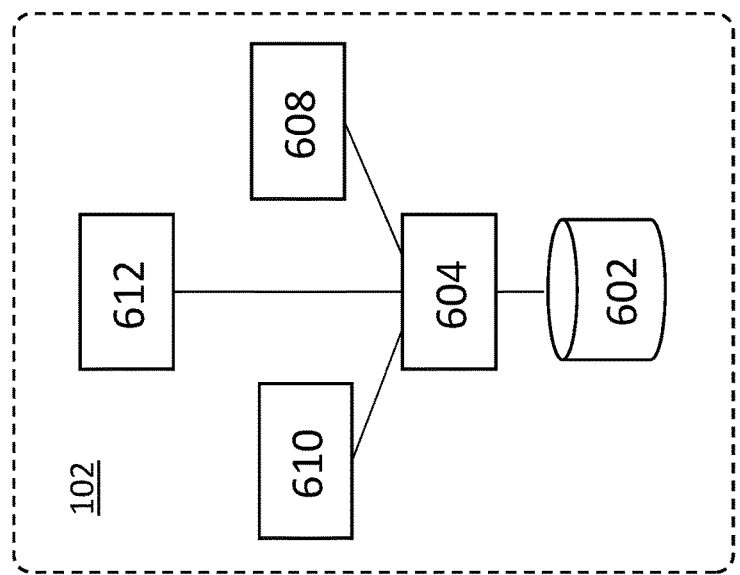
FIG. 6a is a schematic diagram of an exemplary user device.

FIG. 6a is a schematic diagram of the components of a UE 102 according to an exemplary embodiment.

UE 102 comprises processor 604 functionally connected to memory 602. The UE 102 comprises mobile communications interface 610 for enabling communications to and via mobile network 112, for example for accessing external networks, for example the internet. The UE 102 comprises wireless communications interface 608 for enabling connection of the UE 102 to an external network, for example the internet, via an access point, for example via Wi-Fi.

The processor 604 is functionally connected to the mobile communications interface 610 and the wireless communications interface 608 so as to control transmissions of data therefrom, and to process data received therefrom.

The application module (APP) 126 is be stored as software on the memory 602, and runs as software on the processor 604. The memory 602 also store identifiers received from or via the federation system 100, and the processor 604 causes an identifier so stored to be included in suitable requests for content to content provider 108 sent from, for example, wireless communications interface 608, or mobile communications interface 610.

The UE 102 comprises display screen 612, functionally connected to processor 612. The display screen 612 is for displaying information to a user of the UE 102, and displays a Graphical User Interface (GUI) via which the user controls operations of the processor 604. The display screen 612 may comprise, for example, a touch screen, whereby a user may interact with the graphical user interface displayed thereon.

FIG. 6b is a schematic diagram of the components of a federation system 100 according to an exemplary embodiment.

Federation system 100 comprises processor 604, functionally connected to memory 602. The processor 604 is functionally connected to communications interface 610. The communications interface 610 communicates with UE 102, for example over a communications path comprising mobile network 112, and may communicate with content provider 108, for example, over the internet.

The memory 602 stores identifiers, user identifiers, user personal information, and an encryption key for encrypting and decrypting identifiers. The processor 604 processes data so as to implement, utilizing memory 602 and communications interface 610, the functions of federator 104, identifier manager 106, notification manager 110, and user data repository 116, as described above.

The above embodiments are to be understood as illustrative examples of the invention.

For example, the above embodiments have been described with reference to a mobile network operated by a mobile network operator. However, this need not necessarily be the case. For example, the mobile network described above may alternatively be any access network for providing UE 102 with access to the internet. Such an access network may be operated by, for example, an Internet Service Provider (ISP) which holds user information on each of its subscribers, which information may be proprietary to the ISP, and which information may be stored at the access network. In this example, the federation system 100 as described above may be located within the ISP's trusted network, and allow the ISP to provide user information to a content provider in the manner described above. In this case UE 102 need not necessarily need to connect to a mobile network at any time, and therefore UE 102 may be, for example, a personal computer (PC) or the like.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for providing user information stored at an access network to a content provider, wherein the content provider is external to the access network, the access network being for providing a user device with access to the internet, the user information relating to a user of an application module stored on the user device, the user device for requesting and receiving content from a said content provider; the method comprising, at the access network:
   receiving, from the application module of the user device, a request for an identifier for the user device to use when requesting content from a said content provider, the received request comprising data identifying the content provider;
   generating, based on the received request, a said identifier;
   in response to the received request, transmitting, directly to the application module of the user device, the generated identifier generated by the access network;
   receiving, from the content provider, a request for user information, the request for user information comprising the generated identifier;
   obtaining, based on the generated identifier, user information; and
   transmitting, in response to the received request from the content provider, the obtained user information to the content provider.

2. The method of claim 1, the method comprising:
   verifying that the identified content provider is registered with an operator of the access network; and
   determining, based on the verifying, whether or not to generate a said identifier.

3. The method of claim 1, the method further comprising:
   authenticating the user device; and/or
   authenticating the content provider.

4. The method of claim 1, the method comprising:
   before transmitting the generated identifier to the application module of the user device, encrypting the identifier; and
   decrypting the accordingly encrypted identifier in the received request for user information.

5. The method of claim 1, the method comprising:
   storing the generated identifier in association with a user identifier for identifying the user to the access network, and in association with a content provider identifier for identifying the content provider to the access network.

6. The method of claim 5, wherein the stored generated identifier is unique amongst other identifiers stored at the access network.

7. The method of claim 1, the method comprising:
   determining that the generated identifier is to be updated;
   in response to the determination that the generated identifier is to be updated, generating an updated identifier; and
   transmitting, to a push notification service, a request for the push notification service to push information to the application module of the user device, the information comprising the updated identifier and data identifying the content provider with which the updated identifier is to be used.

8. The method of claim 7, the method comprising one or more of:
   (a) before transmitting the request to the push notification service, encrypting the updated identifier;
   (b) transmitting, to the push notification service, a registration request for registering the user device to receive push notifications from the push notification service;
   (c) overwriting the generated identifier with the updated identifier;
   and/or wherein the determination that the identifier is to be updated is made responsive to receiving a request for user information comprising the identifier.

9. The method of claim 1, wherein the access network is a mobile network.

10. A method for providing user information stored at an access network to a content provider, wherein the content provider is external to the access network, the access network being for providing a user device with access to the internet, the user information relating to a user of an application module stored on the user device, the user device for requesting and receiving content from a said content provider; the method comprising, at the user device:
    generating, at the application module, a request for an identifier for the user device to use when requesting content from a said content provider;
    transmitting, to the access network, the request for an identifier, the request for an identifier comprising data identifying the content provider;
    receiving, at the application module, directly from the access network, a said identifier, the received identifier having been generated by the access network; and
    causing a request for content to the content provider to comprise the received identifier.

11. The method of claim 10, wherein the identifier is encrypted.

12. The method of claim 10, the method comprising:
    receiving, at the application module, from a push notification service, a push notification, the push notification comprising an updated identifier and data identifying a content provider with which the updated identifier is to be used.

13. The method of claim 12, the method comprising one or both of:
    (a) transmitting, to the push notification service, a registration request for registering the user device to receive push notifications from the push notification service;
    receiving, from the push notification service, a registration message comprising a token for identifying the user device to the push notification service; and
    transmitting, to the access network, a message comprising the token; and
    (b) causing a further request for content to the content provider to comprise the updated identifier;
    and/or wherein the updated identifier is encrypted.

14. The method of claim 10, wherein the generating the request for the identifier is dependent on a determination, by the application module, that the user device has requested content from a said content provider.

15. The method of claim 14, wherein the generating the request for the identifier is dependent on an indication by the user of the application module that the user information stored at the access network may be provided to the content provider.

16. The method of claim 10, the method comprising, at the application module:
    storing the received identifier in association with data identifying the content provider with which the identifier is to be used;
    determining that a request for content is a request for content from the content provider;
    inserting the received identifier with which the content provider is associated into the request for content.

17. A method for providing user information stored at an access network to a content provider, wherein the content provider is external to the access network, the access network being for providing a user device with access to the internet, the user information relating to a user of an application module stored on the user device, the user device for requesting and receiving content from a said content provider; the method comprising, at the content provider:
    receiving, from the user device, a request for content, the request for content comprising an identifier generated by the access network, the identifier generated by the access network having been transmitted directly to the user device from the access network, the identifier being generated by the access network in response to a request, generated by the application module of the user device, to provide an identifier for the user device to use when requesting content from the content provider;
    transmitting, to the access network, a request for user information, the request comprising the identifier;
    receiving, from the access network, the user information; and
    transmitting, to the user device, at least a portion of the requested content, at least a portion of the transmitted content being personalized using the user information.

18. The method of claim 17, wherein the identifier is encrypted, and the content provider does not have access to information with which the identifier may be decrypted.

19. A non-transitory computer-readable storage medium comprising computer-executable instructions which, when executed by a processor, cause a computing device to perform a method for providing user information stored at an access network to a content provider, wherein the content provider is external to the access network, the access network being for providing a user device with access to the internet, the user information relating to a user of an application module stored on the user device, the user device for requesting and receiving content from a said content provider; the method comprising, at the access network:
    receiving, from the application module of the user device, a request for an identifier for the user device to use when requesting content from a said content provider, the received request comprising data identifying the content provider;
    generating, based on the received request, a said identifier;
    in response to the received request, transmitting, directly to the application module of the user device, the generated identifier generated by the access network;
    receiving, from the content provider, a request for user information, the request for user information comprising the generated identifier;
    obtaining, based on the generated identifier, user information; and
    transmitting, in response to the received request from the content provider, the obtained user information to the content provider.

20. An apparatus for use in providing user information stored at an access network to a content provider, wherein the content provider is external to the access network, the access network being for providing a user device with access to the internet, the user information relating to a user of an application module stored on the user device, the user device for requesting and receiving content from a said content provider; the apparatus comprising:
    at least one memory including computer program code; and
    at least one processor in data communication with the at least one memory, f
    receive, from the application module of the user device, a request for an identifier for the user device to use when requesting content from a said content provider, the received request comprising data identifying the content provider;
    generate, based on the received request, a said identifier;
    in response to the received request, transmit, directly to the application module of the user device, the generated identifier generated by the processor;
    receive, from the content provider, a request for user information, the request for user information comprising the generated identifier;
    obtain, based on the generated identifier, user information; and
    transmit, in response to the received request from the content provider, the obtained user information to the content provider.

* * * * *